United States Patent
Pan

(10) Patent No.: US 11,737,602 B2
(45) Date of Patent: *Aug. 29, 2023

(54) AUTOMATIC EDIBLE FLUID INJECTION DEVICE OF FOOD FRYING MACHINES

(71) Applicant: O-VIEW Technology Co., Ltd., New Taipei (TW)

(72) Inventor: Chia-I Pan, New Taipei (TW)

(73) Assignee: O-VIEW TECHNOLOGY CO., LTD., New Taipei (TW)

( * ) Notice: Subject to any disclaimer, the term of this patent is extended or adjusted under 35 U.S.C. 154(b) by 543 days.

This patent is subject to a terminal disclaimer.

(21) Appl. No.: 16/890,479

(22) Filed: Jun. 2, 2020

(65) Prior Publication Data

US 2020/0375391 A1    Dec. 3, 2020

(30) Foreign Application Priority Data

Jun. 3, 2019    (TW) .................. 108119241

(51) Int. Cl.
| | |
|---|---|
| *A47J 37/10* | (2006.01) |
| *A47J 37/04* | (2006.01) |
| *A47J 36/32* | (2006.01) |

(52) U.S. Cl.
CPC ............ *A47J 37/106* (2013.01); *A47J 36/32* (2013.01); *A47J 37/047* (2013.01); *A47J 37/105* (2013.01); *A47J 37/108* (2013.01); *A47J 2202/00* (2013.01)

(58) Field of Classification Search
CPC ...... A47J 37/047; A47J 37/105; A47J 37/108; A47J 37/106
See application file for complete search history.

(56) References Cited

U.S. PATENT DOCUMENTS

| | | | | |
|---|---|---|---|---|
| 4,571,474 A | * | 2/1986 | Pomroy ............... | H05B 6/6411 |
| | | | | 219/389 |
| 9,693,654 B2 | * | 7/2017 | Smith ...................... | A47J 36/34 |
| 2015/0122133 A1 | * | 5/2015 | Zhang ...................... | A47J 37/10 |
| | | | | 99/407 |

(Continued)

FOREIGN PATENT DOCUMENTS

| | | | |
|---|---|---|---|
| CN | 102973159 A | * | 3/2013 |
| CN | 106419478 A | * | 2/2017 |

(Continued)

*Primary Examiner* — John J Norton
(74) *Attorney, Agent, or Firm* — Muncy, Geissler, Olds & Lowe, P.C.

(57) ABSTRACT

An automatic edible fluid injection device of food flying machines is disclosed, comprising a machine body which is mounted with a food flying pot and an edible fluid adding device, wherein the edible fluid adding device includes a material feeding arm and a material feeding cylinder connected to the material feeding arm, and the material feeding arm is fixedly installed with a tilted material discharge fixing device and configured with a plurality of peristaltic pumps, as well as the same amount of material containers and material tube as the peristaltic pumps, and an end of each of the material tubes extends into each of the material containers and then passes around the peristaltic pump so as to detour to the material discharge fixing device to be fixed therein, and the master controller controls the material feeding cylinder and each of the peristaltic pumps such that, after activation.

6 Claims, 21 Drawing Sheets

(56) References Cited

U.S. PATENT DOCUMENTS

| | | | | |
|---|---|---|---|---|
| 2015/0238051 A1* | 8/2015 | Xu | ............ | A47J 36/34 |
| | | | | 99/487 |
| 2016/0106259 A1* | 4/2016 | Xu | ............ | G07F 9/105 |
| | | | | 700/275 |
| 2016/0128503 A1* | 5/2016 | Xu | ............ | H05B 6/062 |
| | | | | 99/326 |

FOREIGN PATENT DOCUMENTS

| | | | | | |
|---|---|---|---|---|---|
| CN | 106889867 A | * | 6/2017 | ............ | A47J 27/002 |
| CN | 109674336 A | * | 4/2019 | | |
| CN | 208784354 U | * | 4/2019 | | |
| JP | 2006061183 A | * | 3/2006 | | |

\* cited by examiner

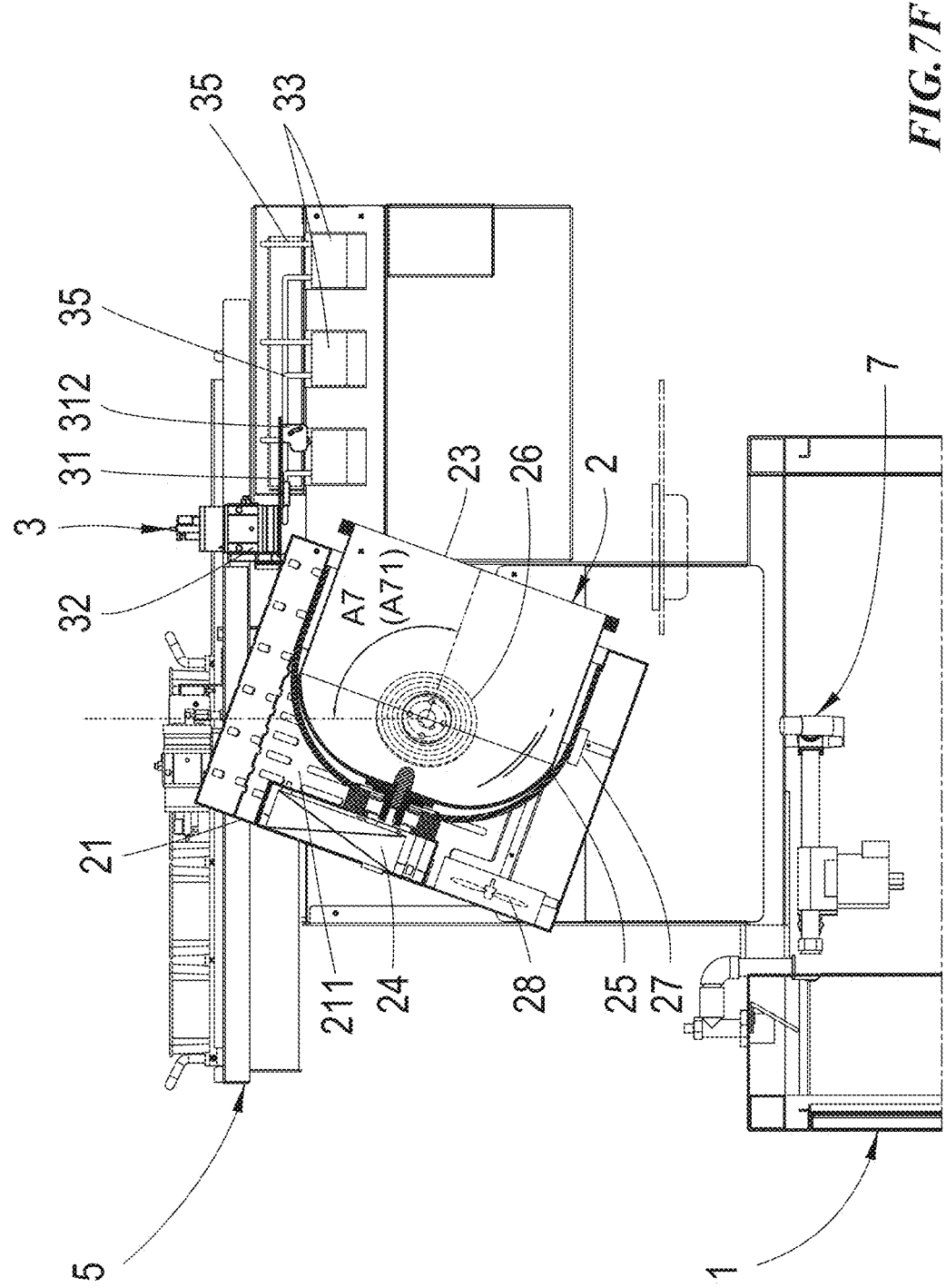

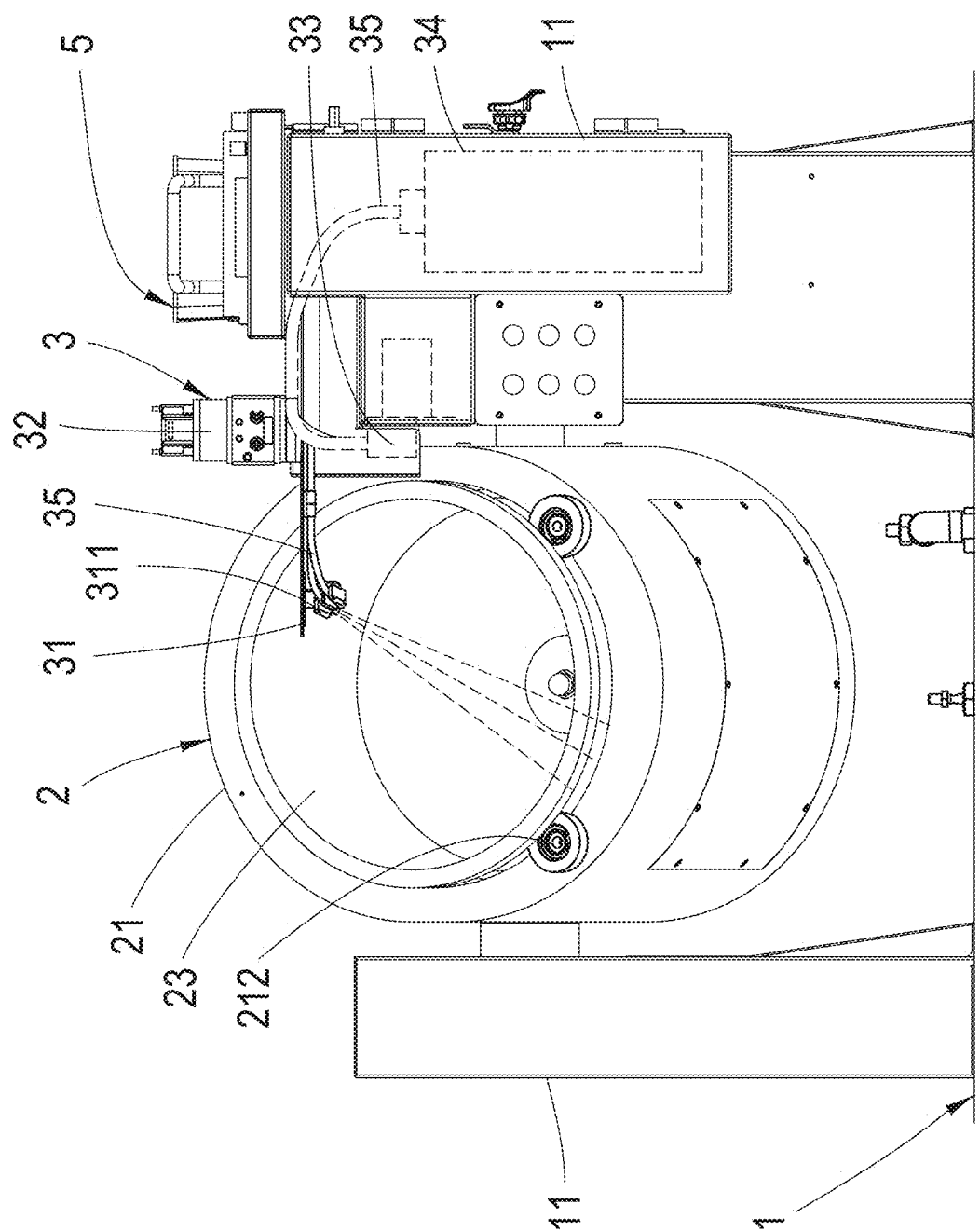

AUTOMATIC EDIBLE FLUID INJECTION DEVICE OF FOOD FRYING MACHINES

BACKGROUND OF THE INVENTION

1. Field of the Invention

The present invention generally relates to an automatic edible fluid injection device for food frying machines; more specifically, it concerns an automatic or semi-automatic equipment for food cooking, and particularly, it is about an equipment structure capable of automatically adding various edible fluids such as condiments and food ingredients or materials, etc.

2. Description of Related Art

The advancements of science and technologies facilitate significant convenience to human life, and automated equipments also save lots of manpower costs and reduce technical problems which may be incurred because of human labors. In addition, as the population grows and human demands for food increase greatly, in order to ensure the stability of cooking quality, many restaurants and hotels formulate systematic protocols and processes regarding to relevant production processes from the material sources, production steps, proportion allocations, time arrangements and temperature controls, but the standardizations of foods and dishes still need to be completed by the professional chefs. In view of the aforementioned issues, it would be very desirable if a set of automated equipments can be successfully provided and applied so as to complete its systematic production processes and the standardizations of customized dishes thereby saving manpower requirements and improving the production efficiency.

Therefore, by providing equipments which are capable of automatically adding edible fluids, e.g., condiments and food materials or ingredients, and controlling the additions via various optional and automatic settings, it is possible to achieve a food flying machine that can produce a variety of different dishes by means of manual setting assistance, thus effectively completing the solution offered by the automatic edible fluid injection device of the food flying machines according to the present invention.

SUMMARY OF THE INVENTION

The present invention discloses an automatic edible fluid injection device of food flying machines is disclosed, comprising: a machine body, including at least a support body; a food flying pot, including at least a hollow outer case body mounted on the support body, in which the outer case body is pivotally installed with a servo motor which is used to memorize an edible fluid adding angle in order to control the operating position of the outer case body, and the outer case body is recessively installed with a notch from the outside toward the inside, and the interior of the notch is pivotally installed with an inner flying pot whose bottom is pivotally installed with an inner pot motor, and in which the periphery of the inner flying pot is installed with a heat-resistant support board whose outside is installed in attachment with a heating coil, a temperature sensing device and at least one radiator, and the temperature sensing device is set up to sense the temperature of the outer wall of the inner flying pot through the heat-resistant support board thereby further controlling the temperature of the inner flying pot upon heating it; an edible fluid adding device, including a material feeding arm and a material feeding cylinder installed in connection with the material feeding arm, in which the material feeding arm is fixedly installed with a tilted material discharge fixing device such that an angle can be formed between the material discharge fixing device and the material feeding arm, and the material feeing cylinder is mounted on the support body and applied to control the material feeding arm to swing horizontally, and in which plural peristaltic pumps are installed on the support body, and the same amount of material containers and material tubes as each of the plural peristaltic pumps are respectively allocated, wherein each of the material containers is applied for filling and containing an edible fluid, and one side of the each of the materials tube extends into each of the material containers and then passes around the peristaltic pump so as to detour to the material discharge fixing device to be fixed therein; and a master controller, respectively connected to the servo motor, the inner pot motor, the heating coil, the temperature sensing device, the radiator, the material feeding cylinder as well as each of the peristaltic pumps.

In a preferred embodiment, the servo motor and each of the material containers are all installed inside the support body.

In a preferred embodiment, at least two guide wheels are respectively installed on the edge of the notch opening, a guide board is further arranged on the edge of the notch opening in the outer case body, and the guide board is oppositely located between the two guide wheels.

In a preferred embodiment, the formed angle ranges from 95° to 110°.

In a preferred embodiment, an adjustment block is installed on the material feeding arm for connecting the material feeding arm and the material discharge fixing device, and an arc-shaped long hole is opened on the adjustment block, and the material discharge fixing device is convexly installed with a protrusion which can extend into the long hole, thereby that the material discharge fixing device is allowed to pivotally rotate on the adjusting block for adjusting the formed angle, while the long hole and the protrusion restrict the adjustment range of the formed angle.

In a preferred embodiment, the edible fluid adding angle ranges from 62° to 72°.

In a preferred embodiment, the exterior of the outer case body is installed with a position difference sensing device connected to the master controller and applied to sense the start and end positions of the rotation of the outer case body in order to limit the outer case body to operate in this safe angle range, and the position difference sensing device also respectively includes a start position determination block, an end position determination block, a start sensing terminal and an end sensing terminal, in which the start position determination block and the end position determination block are respectively installed on a surface of the exterior of the outer case body in opposition to the support body, and the start sensing terminal and the end sensing terminal are respectively installed on a surface of the exterior of the support body in opposition to the outer case body, such that, when the outer case body rotates, if the start sensing terminal detects the start position determination block, or otherwise the end sensing terminal detects the end position determination block, then the master controller controls the servo motor to stop the rotation operation.

BRIEF DESCRIPTION OF THE DRAWINGS

FIG. 7F shows a cross-section view of the automatic food flying machine according to the present invention, illustrated at its pouring angle while located at the pouring-start position.

FIG. 8 shows a planar view for implementing the edible fluid addition in the automatic food flying machine according to the present invention.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Figure 1:
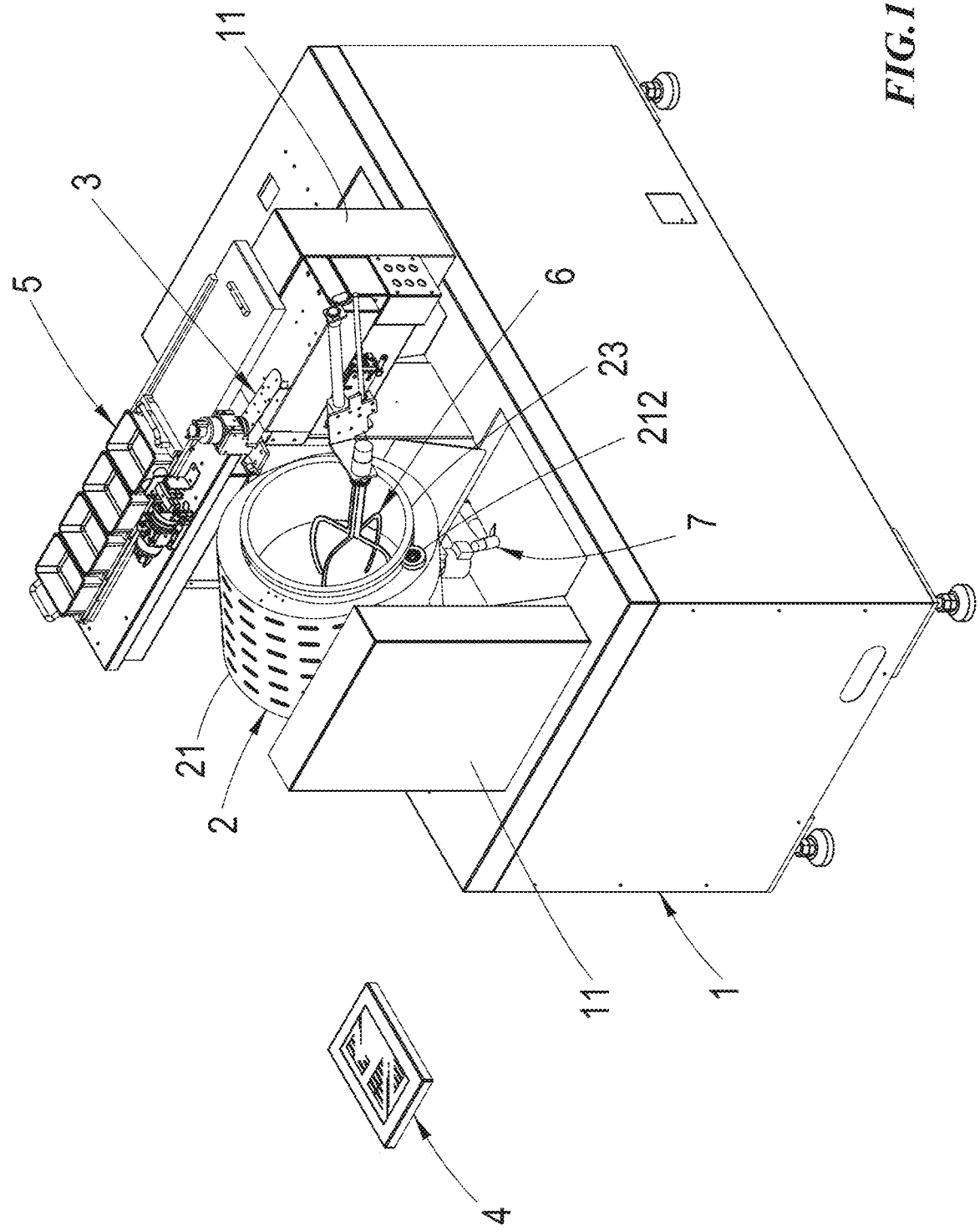
FIG. 1 shows an overall structural stereo view of the automatic food flying machine according to the present invention.

Refer first to FIG. 1, wherein an overall structural stereo view of the automatic food flying machine according to the present invention is shown, and, as illustrated therein, it comprises a machine body 1, a food flying pot 2, an edible fluid adding device 3 and a master controller 4.

Herein the machine body 1 includes at least a support body 11.

Figure 2:
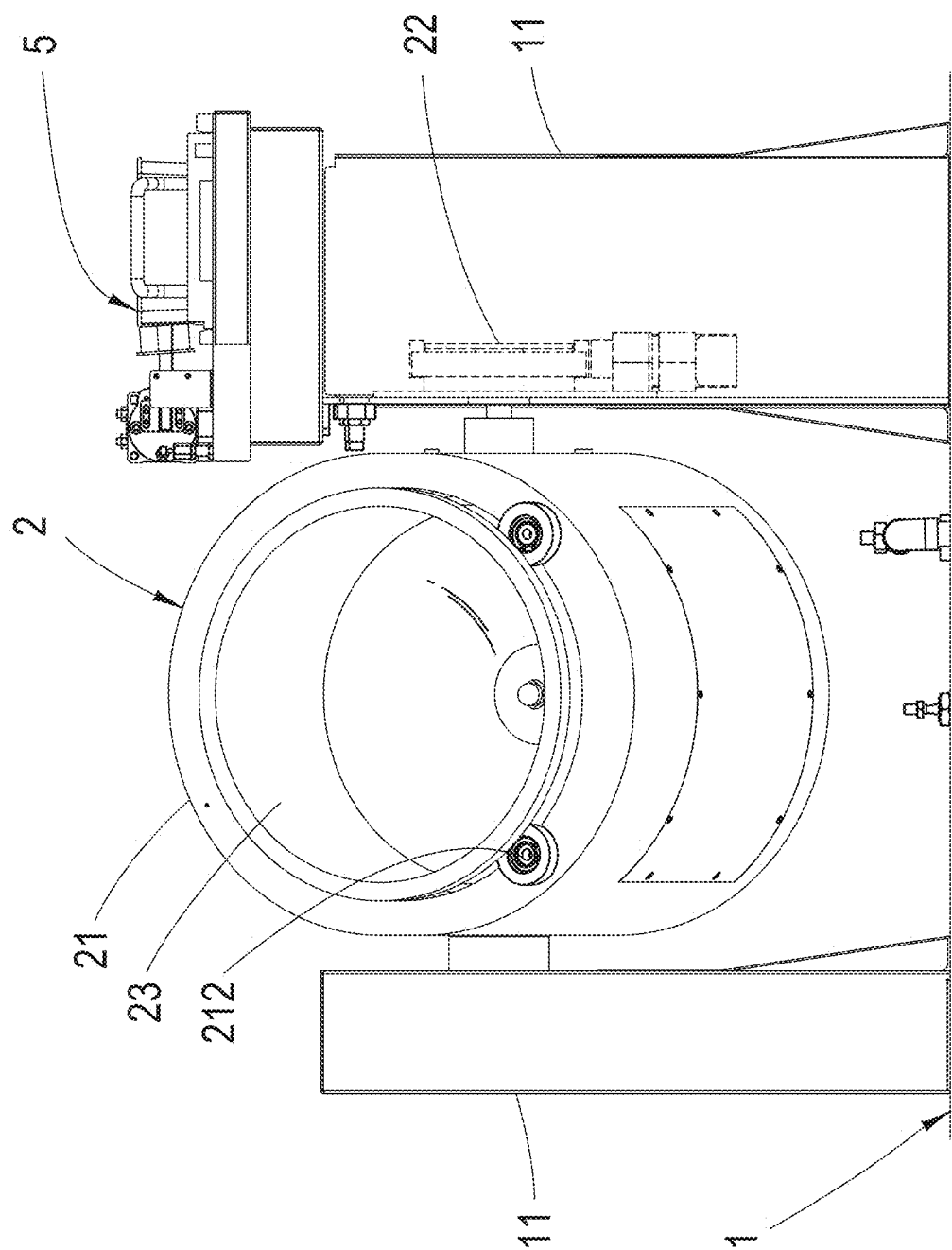
FIG. 2 shows a structural plane view of the food flying pot in the automatic food flying machine according to the present invention.
Figure 3:
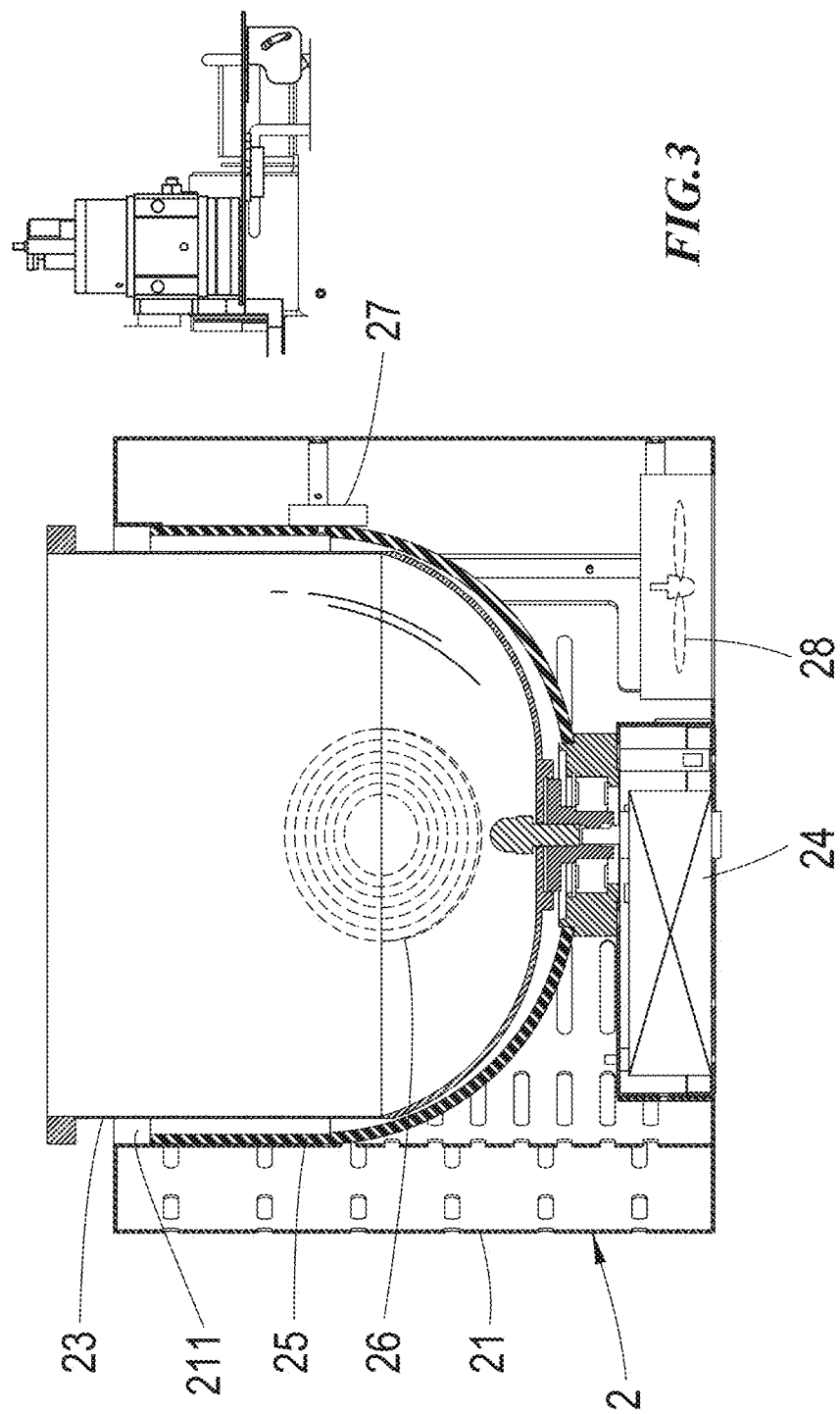
FIG. 3 shows a structural cross-section view of the food flying pot in the automatic food flying machine according to the present invention.
Figure 4:
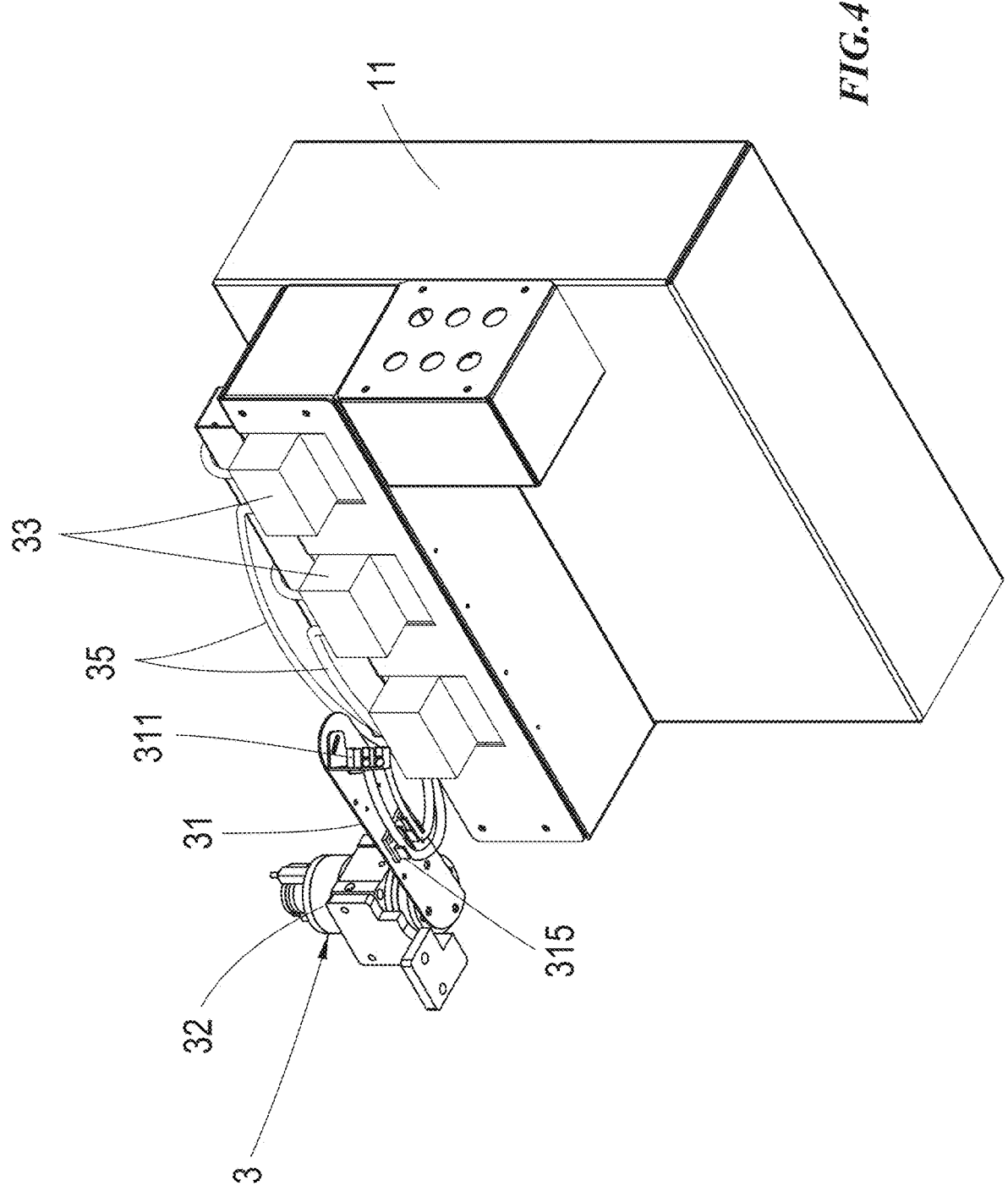
FIG. 4 shows a structural stereo view of the edible fluid adding device in the automatic food flying machine according to the present invention.

Also, refer conjunctively to FIGS. 1 to 3, the food flying pot 2 has at least a hollow outer case body 21 mounted on the support body 11, and the outer case body 21 is pivotally configured with a servo motor 22; in the present embodiment, the servo motor 22 is installed inside the support body 11 and is used to memorize the rotation angle so as to control the working position of the outer case body 21. It can be seen that the outer case body 21 is recessively installed with a notch 211 from the outside toward the inside, and at least two guide wheels 212 are respectively installed on the edge of the opening of the notch 211; besides, the interior of the notch 211 is pivotally installed with an inner flying pot 23 whose bottom is pivotally installed with an inner pot motor 24 capable of driving the inner flying pot 23 to rotate. In the present embodiment, the inner pot motor 24 is set up at the bottom of the notch 211, and the periphery of the inner flying pot 23 is installed with a heat-resistant support board 25 made of glass materials, and the exterior of the heat-resistant support board 25 is installed in attachment with a heating coil 26, a temperature sensing device 27 and at least one radiator 28. In addition, the temperature sensing device 27 is set up to sense the temperature of the outer wall of the inner flying pot 23 through the heat-resistant support board 25 thereby further controlling the temperature of the inner flying pot 23 upon heating it.

Next, refer conjunctively to FIGS. 1 and 4~6, herein the edible fluid adding device 3 has a horizontally arranged material feeding arm 31 and a material feeding cylinder 32 connected to the material feeding arm 31, and the material feeding arm 31 is fixedly installed with an inclined material discharge fixing device 311 in which an angle A1 is formed between the material discharge fixing device 311 and the material feeding arm 31, and the formed angle A1 may range from 95° to 110° (including 95°, 96°, 97°, 98°, 99°, 100°, 101°, 102°, 103°, 104°, 105°, 106°, 107°, 108°, 109°, 110°.) In addition, the material feeding cylinder 32 is used to control the material feeding arm 31 to swing horizontally, and the material feeding cylinder 32 is mounted on the support body 11, while the same support body 11 is also provided with a plurality of peristaltic pump 33 and also installed with the same amount of the material containers 34 and material tubes 35 as the peristaltic pumps 33, and each material container 34 is applied to contain an edible fluid (i.e., liquid condiments or liquid food materials, such as: salad oil, soy sauce, vinegar or egg liquid) and can be placed inside the support body 11. One end of each of the material tubes 35 extends into each of the material containers 34, and then passes around each of the peristaltic pumps 33 to detour to the material discharge fixing device 311 to be fixed therein, and the other end of each of the material tubes 35, along with the tilted material discharge fixing device 311, can restrict the material discharge direction.

Herein the master controller 4 is respectively connected to the servo motor 22, the inner pot motor 24, the heating coil 26, the temperature sensing device 27, the radiators 28, the material feeding cylinder 32 as well as each of the peristaltic pumps 33 so as to facilitate the controls of the operations of such components and their parameters, and automatic or manual operation modes can appropriately selection.

Figure 7A:
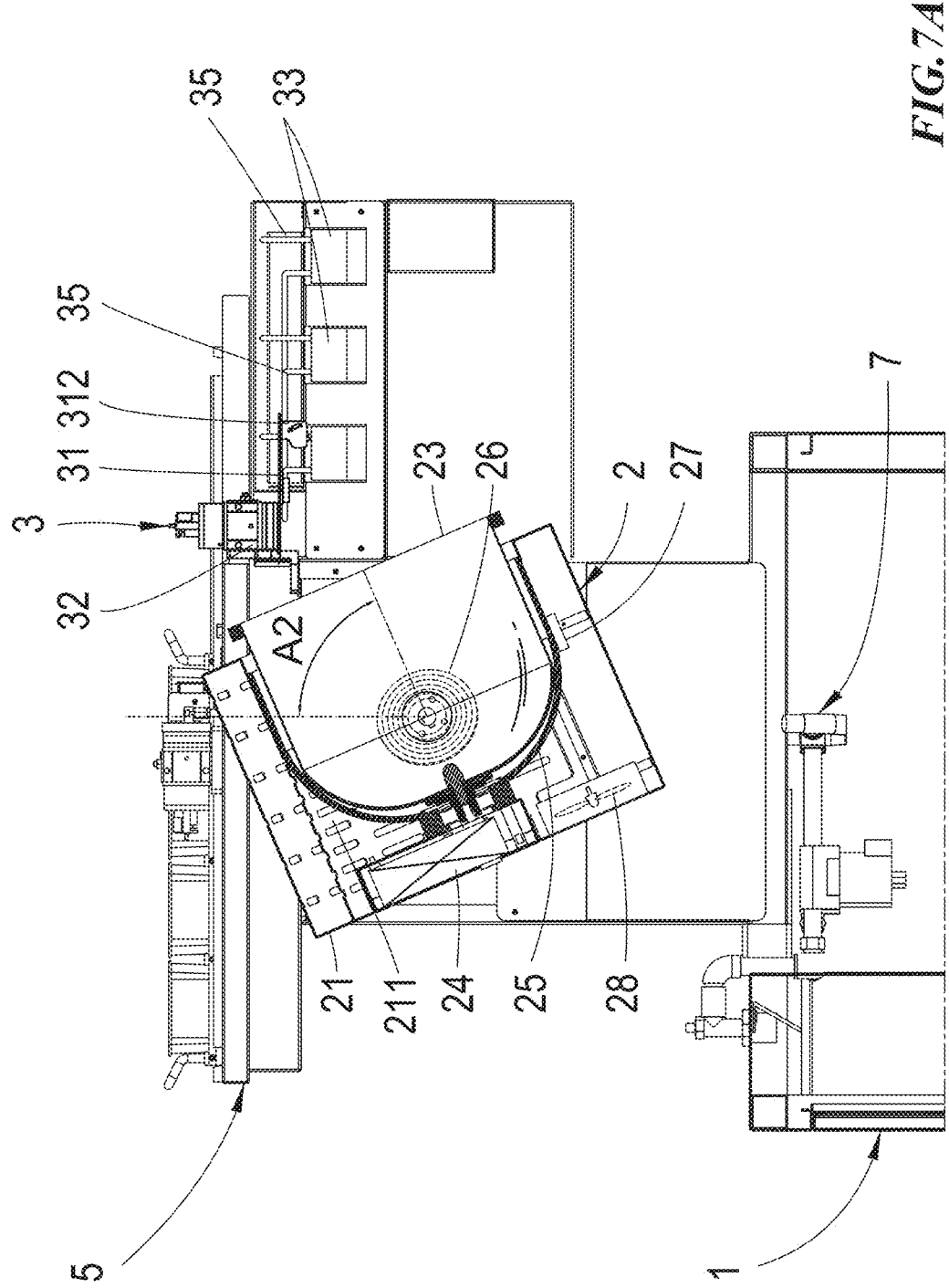
FIG. 7A shows a cross-section view of the automatic food flying machine according to the present invention, illustrated at its standby angle.
Figure 7B:
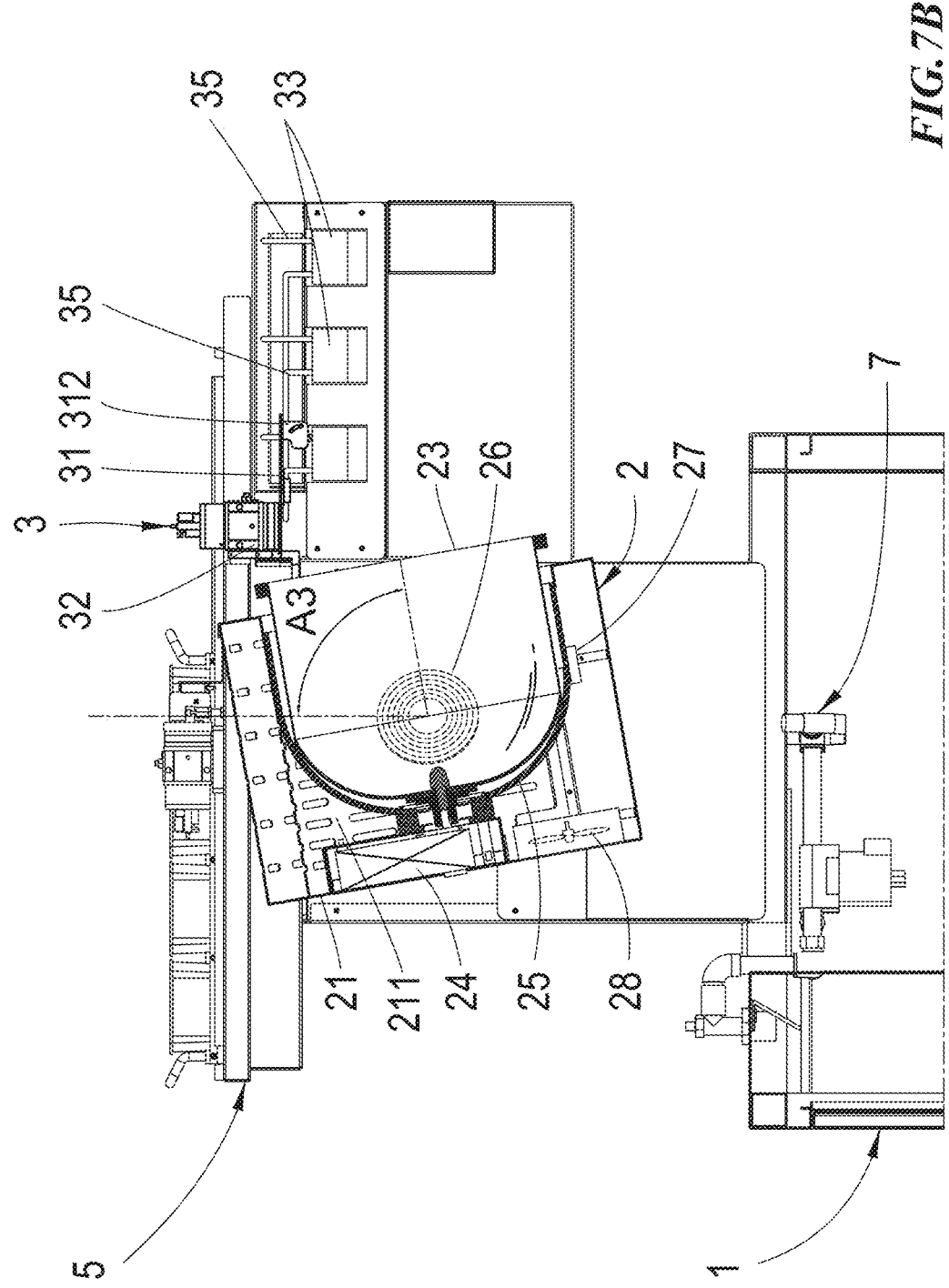
FIG. 7B shows a cross-section view of the automatic food flying machine according to the present invention, illustrated at its heating-pot angle.
Figure 7C:
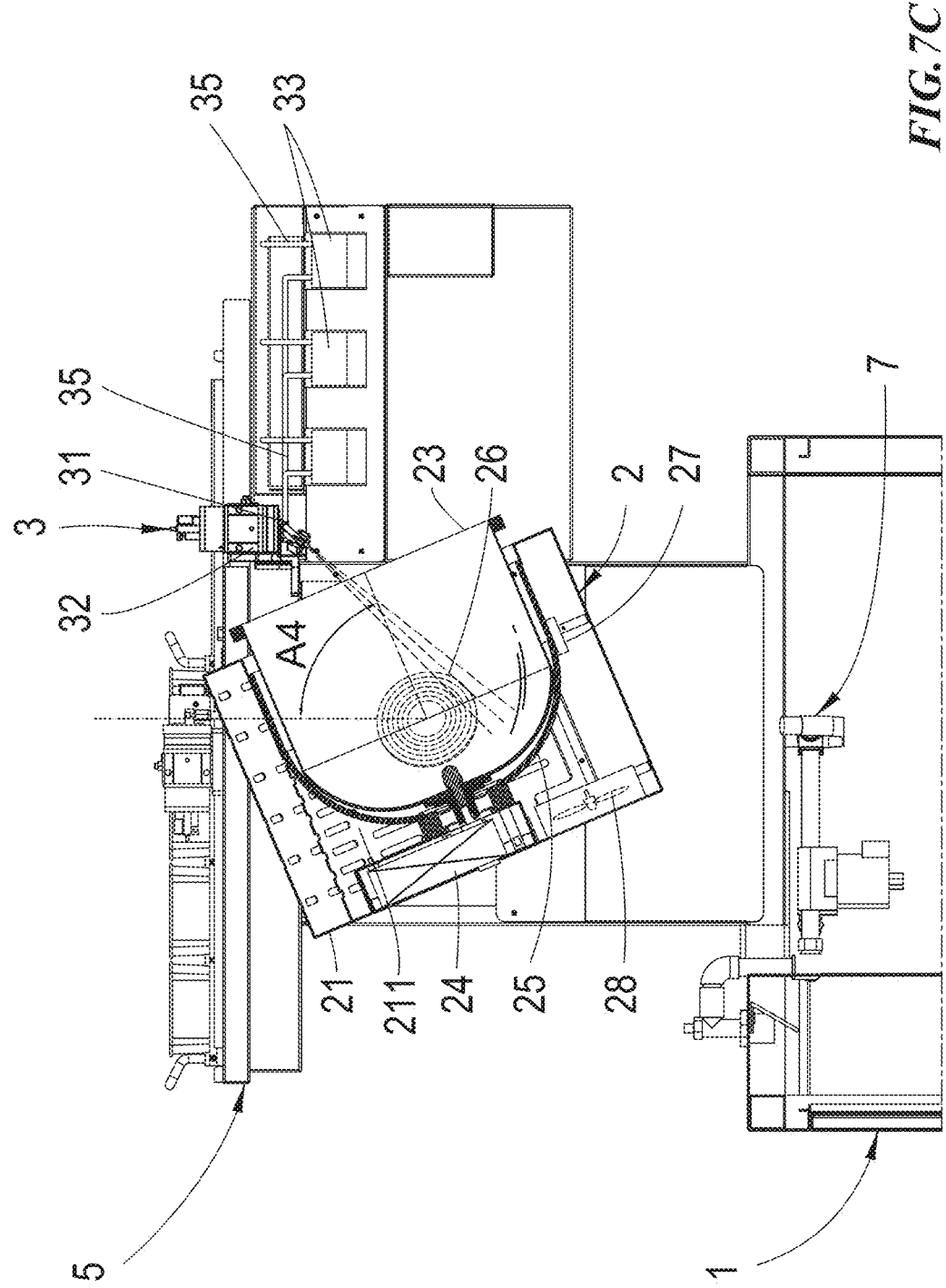
FIG. 7C shows a cross-section view of the automatic food flying machine according to the present invention, illustrated at its adding-edible-fluid angle.
Figure 7D:
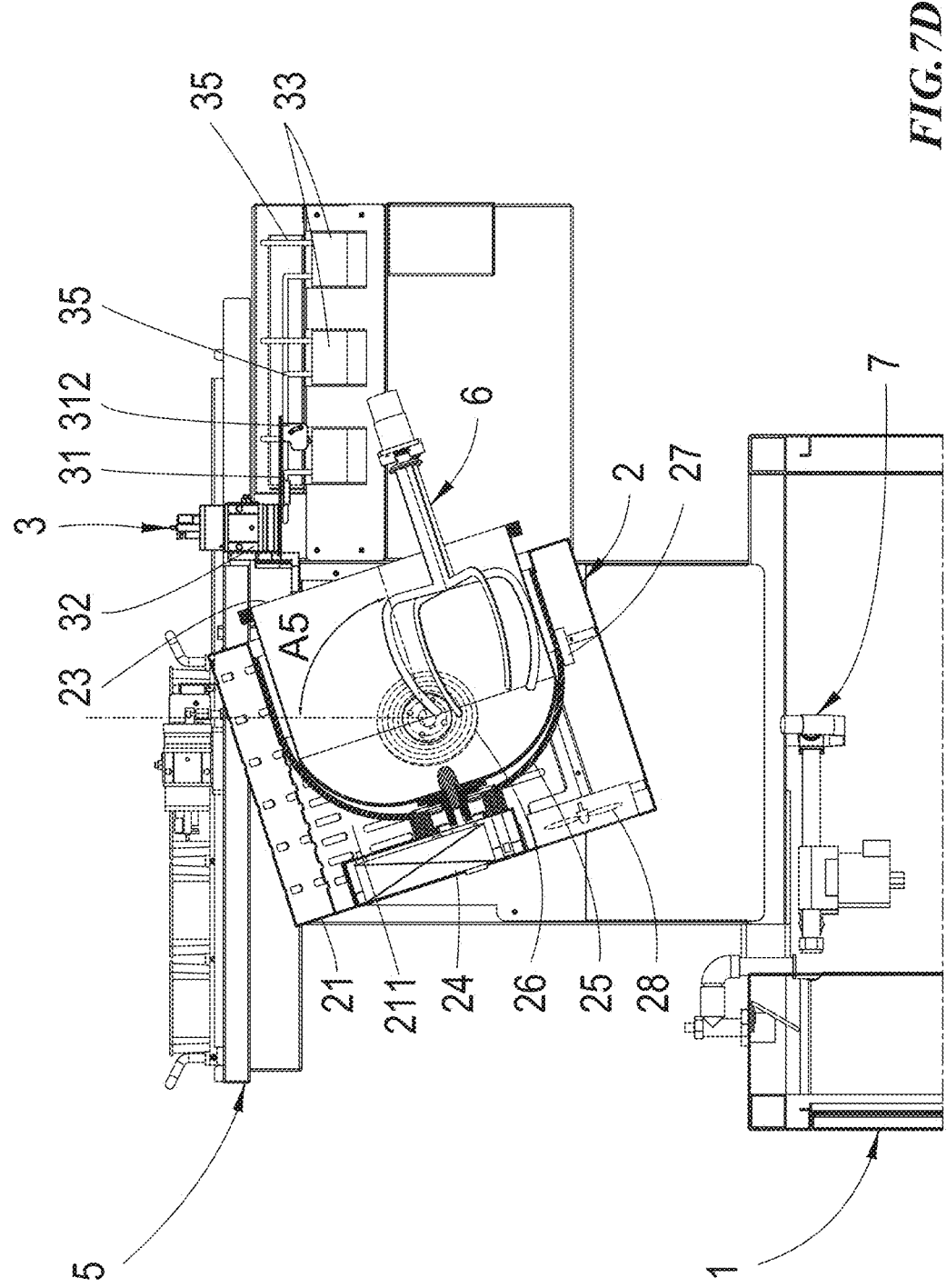
FIG. 7D shows a cross-section view of the automatic food flying machine according to the present invention, illustrated at its stir-frying angle.
Figure 7E:
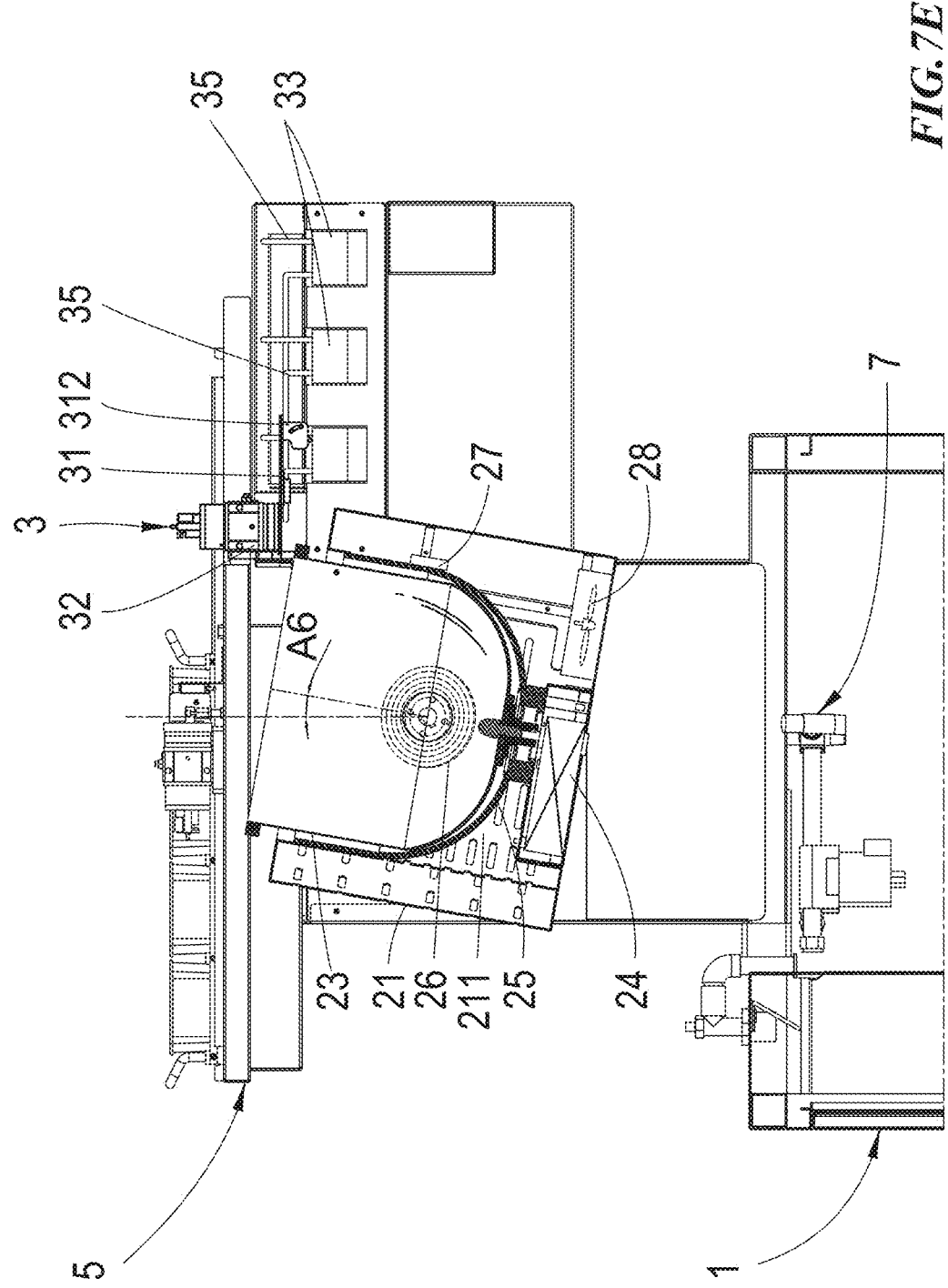
FIG. 7E shows a cross-section view of the automatic food flying machine according to the present invention, illustrated at its adding-food-material angle.

Refer to FIG. 7A, wherein the automatic edible fluid injection device of food frying machines according to the present invention is in the standby condition, and the servo motor 22 stops the outer case body 21 at a standby angle A2 (it should be noticed that the servo motor 22 can memorize the actions of the outer case body 21 corresponding to different angle ranges, and the outer case body 21 is driven by the servo motor 22 to a predetermined angular position all the time; however, for brevity, the following paragraphs will not specifically describe that the outer case body 21 is driven by the servo motor 22.) Then, after activation, refer to FIG. 7B, the outer case body 21 is driven to turn to a heating-pot angle A3, and at this angle A3, the inner pot motor 24 and the heating coil 26 will start at the same time such that the heating coil 26 heats the inner flying pot 23 through the heat-resistant support board 25, and the inner frying pot 23 can be rotated by means of the inner pot motor 24 so that the heating can be uniform. Refer next to FIGS. 7C and 8, when the temperature sensing device 27 detects that the inner flying pot 23 reaches a predetermined temperature, the outer case body 21 turns to an adding-edible-fluid angle A4; at this angle A4, the inner pot motor 24 and the heating coil 26 are still operating at the same time, and the edible fluid adding device 3 is conjunctively started again; then, the material feeding cylinder 32 turns and moves the material feeding arm 31 above the inner frying pot 23, and then drives the peristaltic pump 33 to rotate forward to extract the salad oil in the corresponding material container 34 into the material tube 35 then to the material discharge fixing device 311, and further into the inner frying pot 23. After adding oil, the peristaltic pump 33 will operate reversely to recover a portion of the oil to avoid the oil remaining in the material tube 35 and cause leakage or other issues, and then turn the outer case body 21 to the heating-pot angle A3 to continuously make the oil evenly heated in the inner frying pot 23; then later, when the temperature sensing device 27 detects that the inner frying pot 23 and the internal oil reach a predetermined temperature, this heating-pot process is successfully completed. Then, the outer case body 21 is turned to the adding-edible-fluid angle A4, and the required edible fluid will be added based on the cooking requirements. For example, if the recipe to be prepared is "Fried Rice", then the material feeding cylinder 32 will turn and move the material feeding arm 31 above the inner frying pot 23 and drive the peristaltic pump 33, preferentially withdrawing the egg liquid stored in the corresponding material container 34 into the inner frying pot 23, then the outer case body 21 is turned to a stir-frying angle A5 to scramble the egg, as shown in FIG. 7D. As shown in FIG. 7E, after frying for a predetermined duration of time, the outer case body 21 is turned to an adding-material angle A6 to add ingredient materials such as rice and other auxiliary ingredients, and then returns to the stir-frying angle A5 to stir the added rice and egg (it should be appreciated that the details concerning such adding, stir-frying and other operations may be set by the user, which belongs to the technology outside the field of the present invention, so the present embodiment is simply exemplary for brief illustrations). After finishing the fried rice, referring to FIGS. 7F and 7G, the outer case body 21 is turned to a pouring angle A7, and the fried rice is poured into a container; referring to FIG. 7H, then, the outer case body 21 is turned to a cleaning angle A8 to facilitate cleaning the inner frying pot 23.

Figure 5:
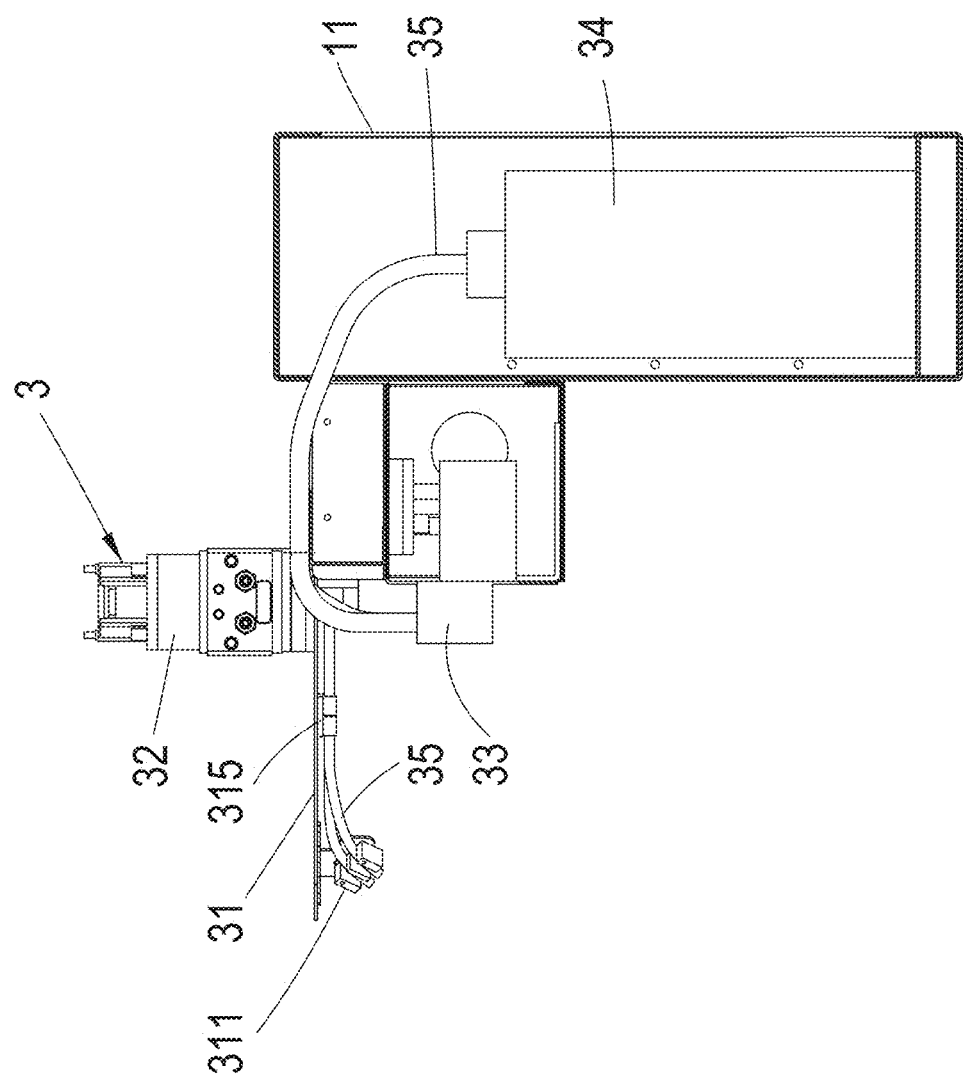
FIG. 5 shows a structural cross-section view of the edible fluid adding device in the automatic food flying machine according to the present invention.

Referring to FIGS. 1 and 5, in the automatic edible fluid injection device of the food frying machine according to the present invention, each of the material containers 34 can be replaced, added or reduced according to the needs, so the user can carry out different arrangements in accordance with different recipes or dishes, and the master controller 4 can set the sequence and the added volume of each the edible fluids for each of the peristaltic pumps 33 thereby quite accurately providing various dishes of stable quality level.

Figure 11:
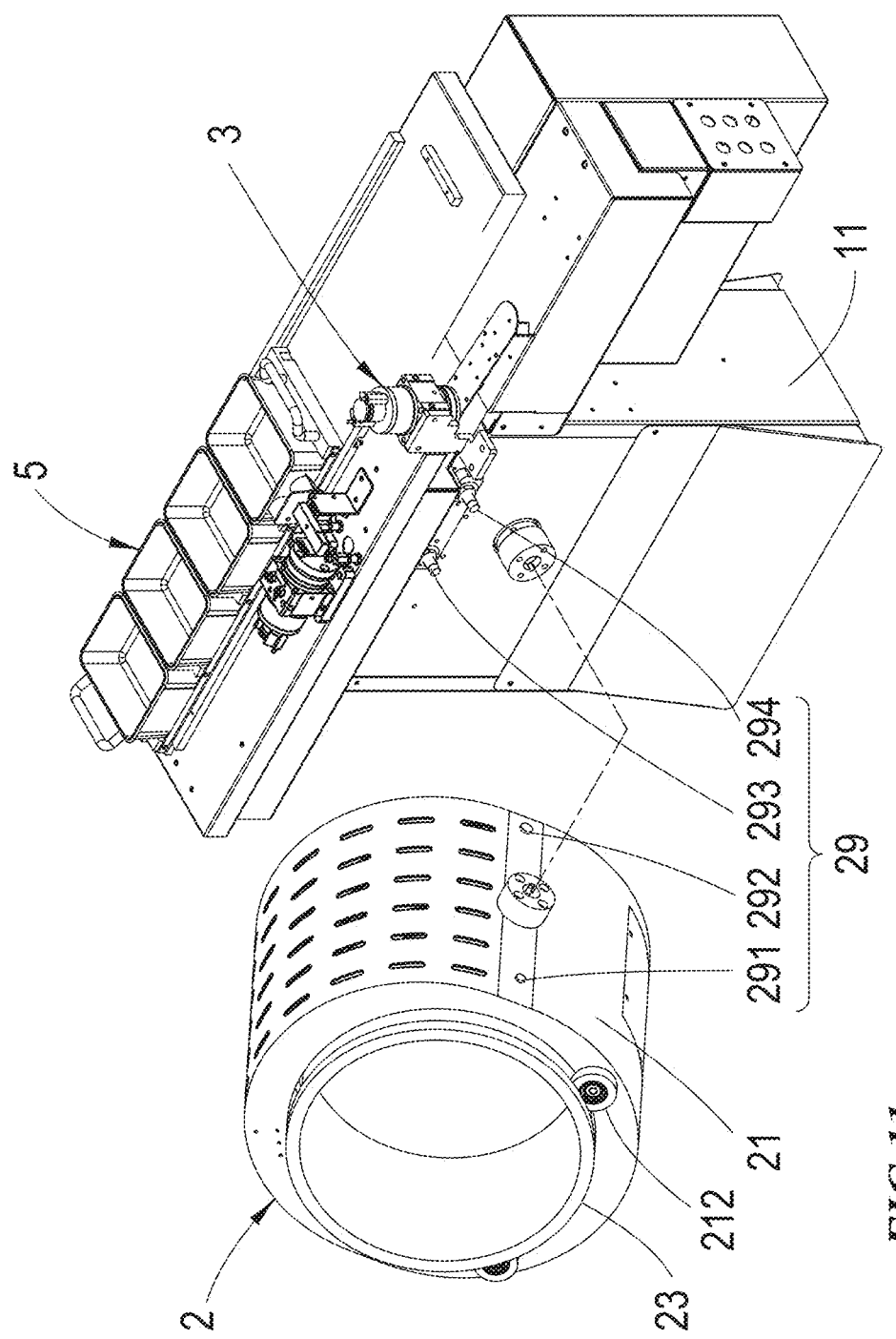
FIG. 11 shows a stereo disassembled view of additionally installing the position difference sensing device in the automatic food flying machine according to the present invention.
Figure 12A:
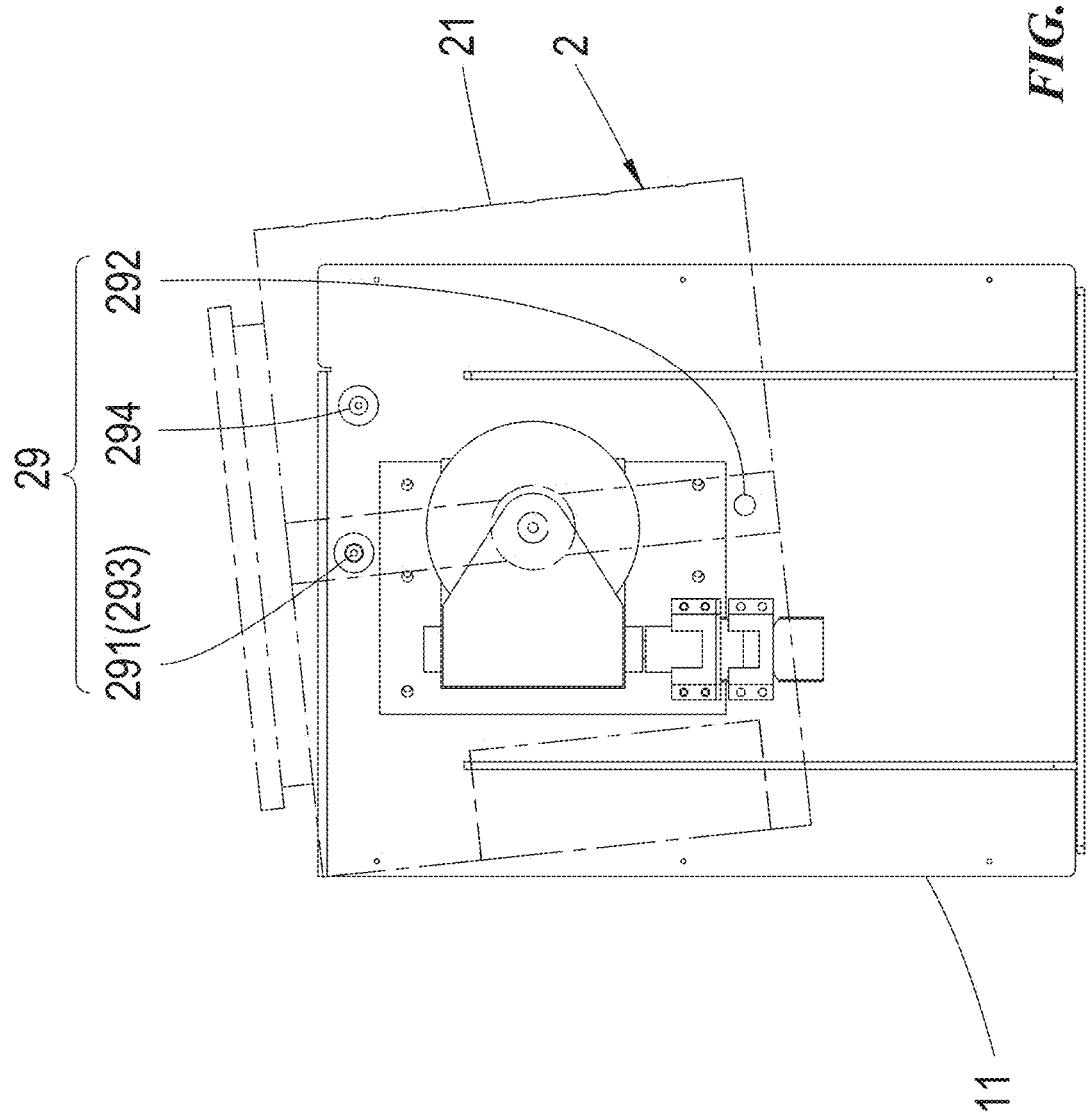
FIG. 12A shows a planar view of the outer case body in the automatic food flying machine according to the present invention, illustrated at its start position.
Figure 12B:
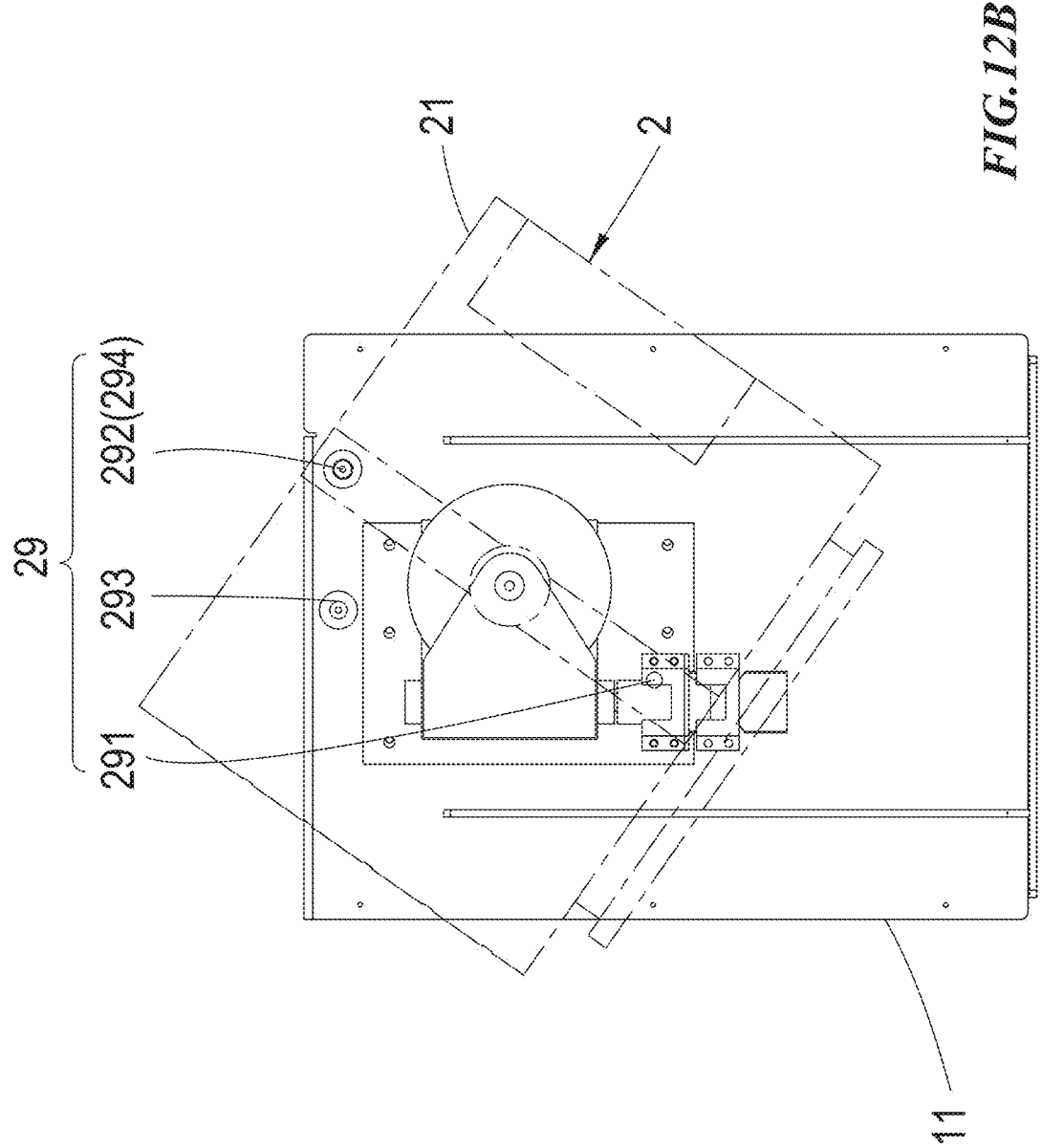
FIG. 12B shows a planar view of the outer case body in the automatic food flying machine according to the present invention, illustrated at its end position.

Moreover, referring to FIGS. 1, 7D, 7E, and 7H, the automatic edible fluid injection device of the food frying machine according to the present invention can be also applied in conjunction with a food material adding device 5, a food frying utensil 6, and a cleaning device 7, in which the food material adding device 5 is used for turning the container holding the food materials above the inner frying pot 23 when the outer case body 21 is at the adding-material angle A6 in order to add the food material into the inner frying pot 23. Besides, referring to FIG. 1, the food frying utensil 6 can enter into the inner frying pot 23 to stir-fly food when the outer case body 21 is located at the stir-frying angle A5. Also, referring to FIG. 11, the cleaning device 7 emits a water column into the inner flying pot 23 when the outer case body 21 is arranged at the cleaning angle A8, then rotating the inner flying pot 23 in conjunction with the inner pot motor 24 to uniformly rinse and wash.

Figure 7G:
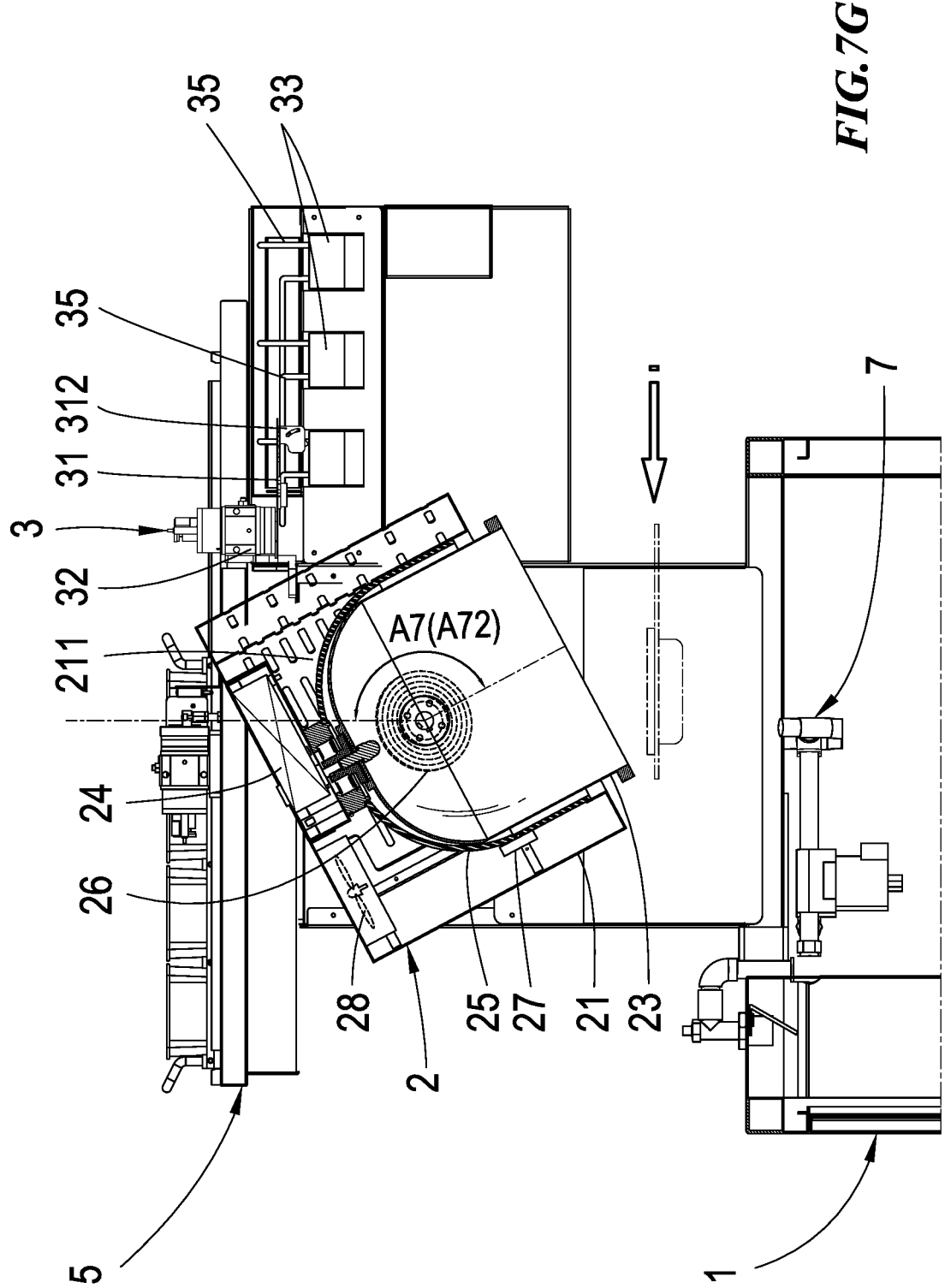
FIG. 7G shows a cross-section view of the automatic food flying machine according to the present invention, illustrated at its pouring angle while located at the pouring-end position.
Figure 7H:
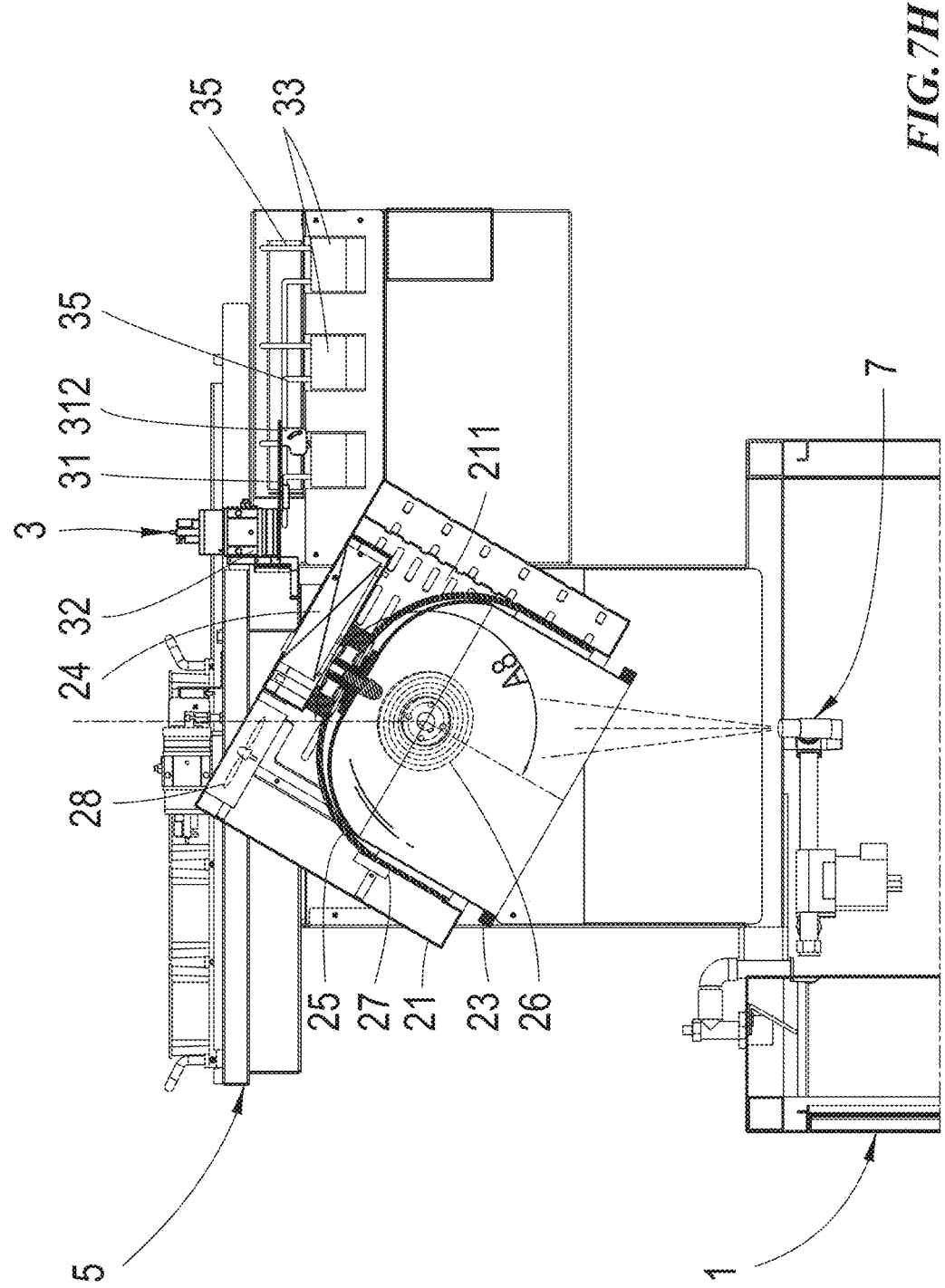
FIG. 7H shows a cross-section view of the automatic food flying machine according to the present invention, illustrated at its cleaning angle.

Referring to FIGS. 7F and 7G, in the automatic edible fluid injection device of the food flying machine according to the present invention, the pouring angle A7 can be separately configured with a pouring-start position A71 and a pouring-end position A72, so that, upon performing the pouring action, the outer case body 21 will take priority over the pouring-start position A71, and the container for holding the prepared food will be correspondingly placed under the opening of the inner frying pot 23, and then the outer case body 21 will continue to rotate to the pouring-end position A72, and the container for holding the food is also moved together so as to receive the sequentially poured food.

Also refer to FIGS. 7A, 7B, 7C, 7D, 7E, 7F, 7G, and 7H, the following table illustrates the memory in the servo motor 22 for the outer case body 21 being located at various angle ranges in terms of different operation demands, in which each angle includes the standby angle A2, the heating-pot angle A3, the adding-edible-fluid angle A4, the stir-frying angle A5, the adding-food-material angle A6, the pouring-angle A7 and the cleaning angle A8, and each angle is calculated with respect to the outer case body 21 arranged in a vertical state as 0 degree; the list of actions corresponding to each angle is shown below:

| Symbol | Range of Angle | Best Angle | Action |
|---|---|---|---|
| A2 | 61.5°, 62.5°, 63.5°, 64.5°, 65.5°, 66.5°, 67.5°, 68.5°, 69.5°, 70.5°, 71.5° | 66.5° | Standby |
| A3 | 75°, 76°, 77°, 78°, 79°, 80°, 81°, 82°, 83°, 84°, 85° | 80° | Heating-Pot |
| A4 | 62°, 63°, 64°, 65°, 66°, 67°, 68°, 69°, 70°, 71°, 72° | 67° | Adding-Edible-Fluid |

-continued

| Symbol | Range of Angle | Best Angle | Action |
|---|---|---|---|
| A5 | 67°, 68°, 69°, 70°, 71°, 72°, 73°, 74°, 75°, 76°, 77° | 72° | Stir-Frying |
| A6 | 5°, 6°, 7°, 8°, 9°, 10°, 11°, 12°, 13°, 14°, 15° | 10° | Add-Food-Material |
| A7 | 110°, 111°, 112°, 113°, 114°, 115°, 116°, 117°, 118°, 119°, 120°, 121°, 122°, 123°, 124°, 125°, 126°, 127°, 128°, 129°, 130°, 131°, 132°, 133°, 134°, 135°, 136°, 137°, 138°, 139°, 140°, 141°, 142°, 143°, 144°, 145°, 146°, 147°, 148°, 149°, 150°, 151°, 152° | | Pouring |
| A71 | 110°, 111°, 112°, 113°, 114°, 115°, 116°, 117°, 118°, 119°, 120° | 110° | Pouring-Start Position |
| A72 | 142°, 143°, 144°, 145°, 146°, 147°, 148°, 149°, 150°, 151°, 152° | 152° | Pouring-End Position |
| A8 | 205°, 206°, 207°, 208°, 209°, 210°, 211°, 212°, 213°, 214°, 215° | 210° | Cleaning |

Figure 9:
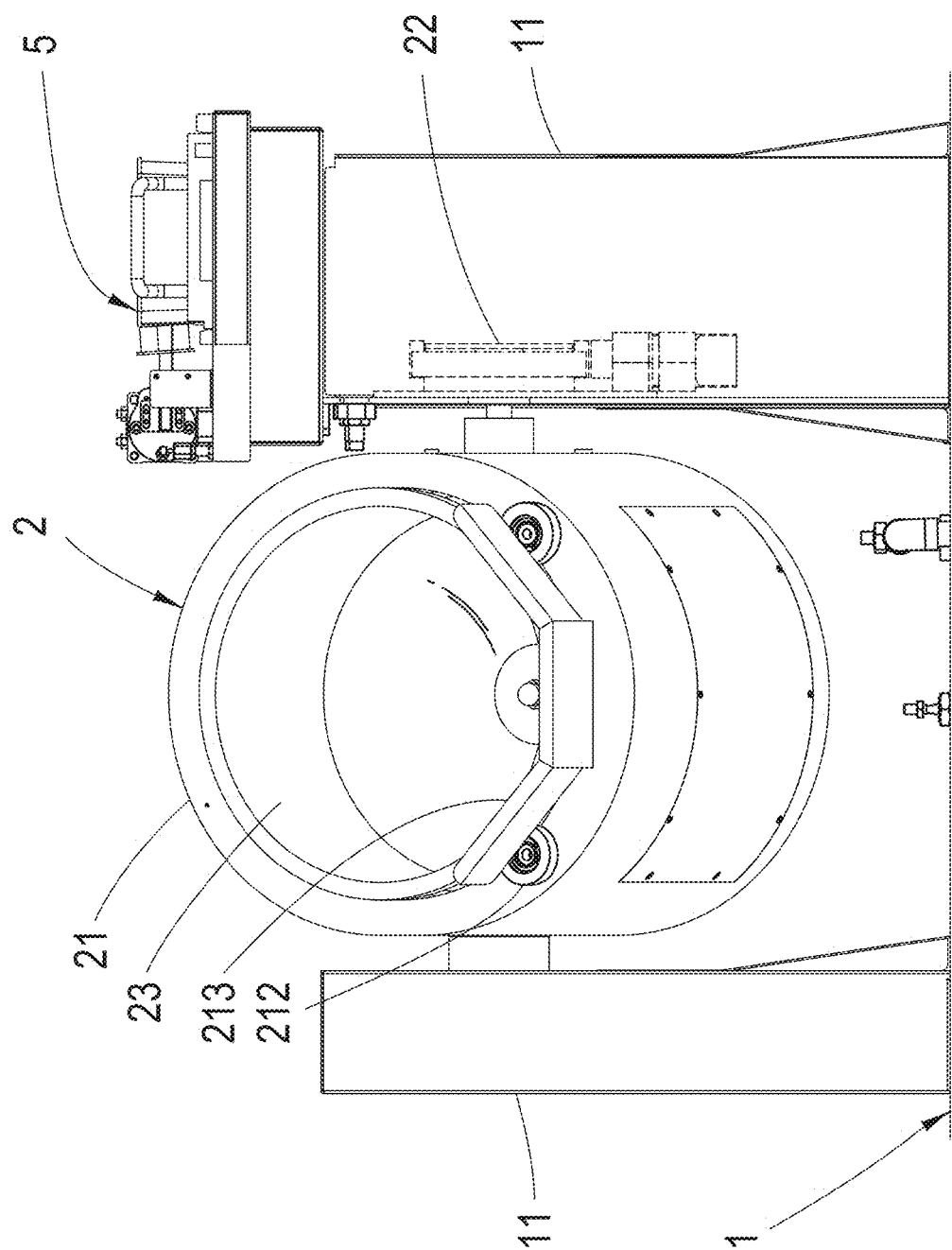
FIG. 9 shows a planar view of additionally installing the guild board in the automatic food flying machine according to the present invention.

Furthermore, referring to FIGS. 3 and 9, in the automatic edible fluid injection device of the food flying machine according to the present invention, a guide board 213 may be further installed at the edge of the opening of the notch 211 in the outer case body 21 and is oppositely located between the two guide wheels 212.

Figure 6:
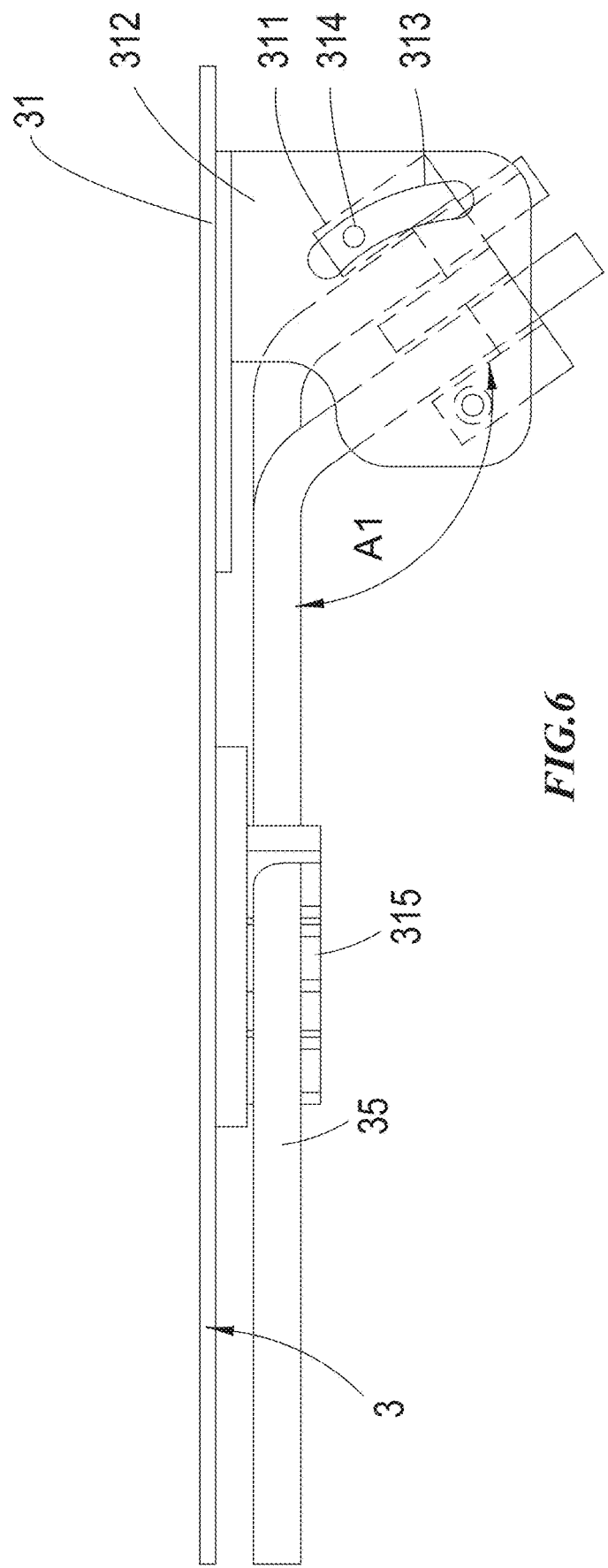
FIG. 6 shows a structurally partial cross-section view of the edible fluid adding device in the automatic food flying machine according to the present invention.
Figure 10:
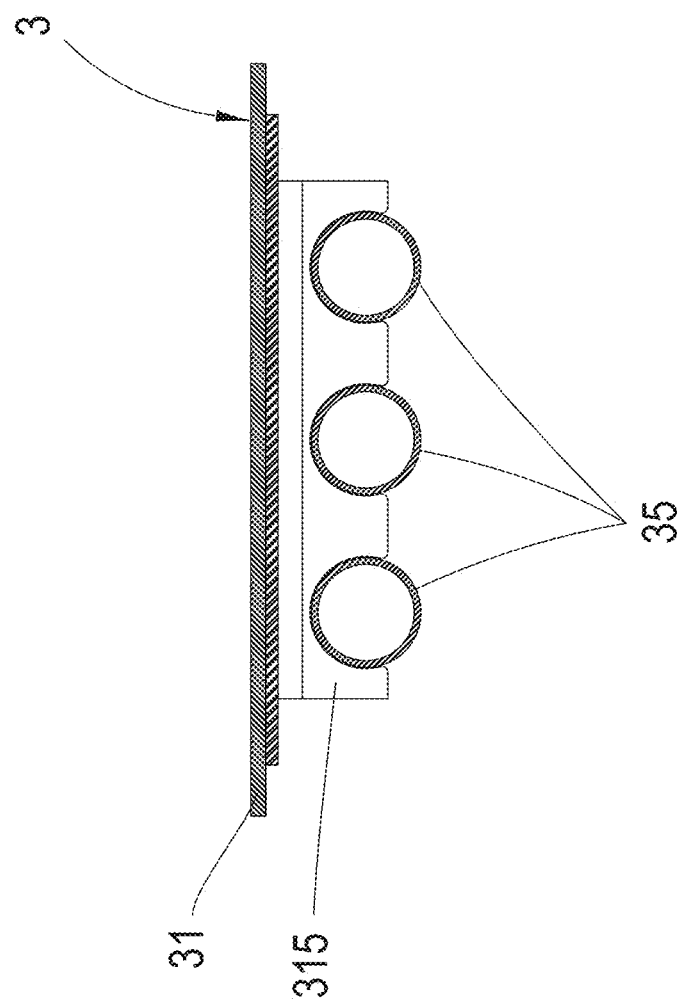
FIG. 10 shows a cross-sectioned view of additionally installing the fixture clip in the automatic food flying machine according to the present invention.

Also referring to FIG. 6, in the automatic edible fluid injection device of food flying machines according to the present invention, an adjustment block 312 can be installed on the material feeding arm 31 for connecting the material feeding arm 31 and the material discharge fixing device 311, and an arc-shaped long hole 313 can be opened on the adjustment block 312, and the material discharge fixing device 311 is convexly installed with a protrusion 314 which can extend into the long hole 313, thereby that the material discharge fixing device 311 is allowed to pivotally rotate on the adjusting block 312 for adjusting the formed angle A1, while the long hole 313 and the protrusion 314 can restrict the adjustment range of the formed angle A1. In addition, referring to FIG. 10, a fixture clip 315 may be further configured on the material feeding arm 31 in order to fixedly clamp each of the material tubes 35 in position.

Now refer to FIGS. 1, 2, 11, 12A, and 12B, wherein, in the automatic edible fluid injection device of the food flying machine according to the present invention, a position difference sensing device 29 connected to the master controller 4 may be installed at the exterior of the outer case body 21 and can be used to detect the positions of the initial and final rotation points of the outer case body 21 thereby limiting the movement of the outer case body 21 within a safe angle range. The aforementioned position difference sensing device 29 includes a start position determination block 291, an end position determination block 292, a start sensing terminal 293 and an end sensing terminal 294, in which the start position determination block 291 and the end position determination block 292 are individually installed on the surfaces of the exterior of the outer case body 21 opposite to the support body 11, while the start sensing terminal 293 and the end sensing terminal 294 are individually installed on the surfaces of the exterior of the support body 11 opposite to the outer case body 21, such that, when the outer case body 21 rotates, if the start sensing terminal 293 detects the start position determination block 291 or alternatively the end sensing terminal 294 detects the end position determination block 292, then the master controller 4 controls the servo motor 22 to stop the rotation operation. In the present embodiment, it can be seen that, when the start sensing terminal 293 detects the start position determination block 291, the outer case body 21 is at the position of 8°, and, on the other hand, when the end sensing terminal 294 detects the end position determination block 292, the outer case body 21 is at the position of 215°, indicating that the safe angle range of the outer case body 21 is between 8°~215°, and since the outer case body 21 is restricted to fall within such a start/end angle range, the outer case body 21 can only return to the standby position by way of the reverse rotation approach so as to prevent continuous rotation actions which may adversely lead to coil or wire winding issues.

Figure 13:
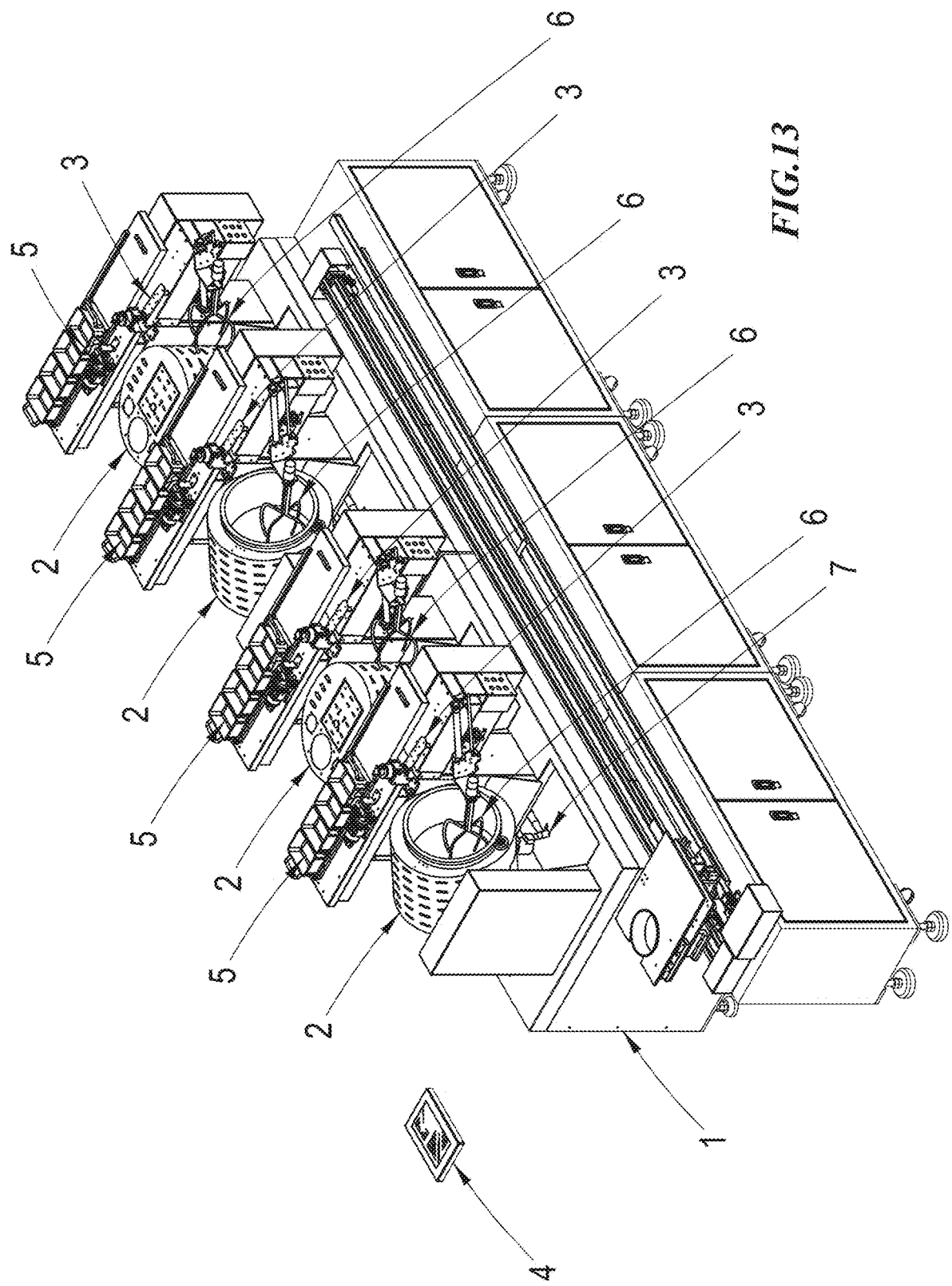
FIG. 13 shows a structural stereo view for a collective configuration of plural sets of the automatic food flying machines according to the present invention.

Moreover, referring to FIG. 13, the food flying pot 2, the edible fluid adding device 3, the food material adding device 5, the food frying utensil 6 and the cleaning device 7 of the automatic edible fluid injection device of the food flying machine according to the present invention can be integrally installed together with multiple sets on one machine body 1 to enhance the overall production efficiency.

The previously disclosed embodiments are merely illustrative of some preferred ones of the present invention, which are not intended to limit the scope thereof; those who are skilled in the relevant technical fields can, after understanding the technical features and embodiments of the present invention as explained hereinabove, certainly make equivalent changes, alterations or modifications without departing from the spirit and scope of the present invention, which are nonetheless deemed as falling within the coverage of the present invention; accordingly, the scope of the present invention to be protected by patent laws is subject to the definition of the claims attached to this specification.

What is claimed is:

1. An automatic edible fluid injection device of food frying machines, comprising:
   a machine body, including at least a support body;
   a food frying pot, including at least a hollow outer case body mounted on the support body, in which the outer case body is pivotally installed with a servo motor which is used to memorize an edible fluid adding angle in order to control the operating position of the outer case body, and the outer case body is recessively installed with a notch from the outside toward the inside, and the interior of the notch is pivotally installed with an inner frying pot whose bottom is pivotally installed with an inner pot motor;
   an edible fluid adding device, including a material feeding arm and a material feeding cylinder installed in connection with the material feeding arm, in which the material feeding arm is fixedly installed with a tilted material discharge fixing device such that an angle can be formed between the material discharge fixing device and the material feeding arm, and the material feeding cylinder is mounted on the support body and applied to control the material feeding arm to swing horizontally, and in which plural peristaltic pumps are installed on the support body, and the same amount of material containers and material tubes as each of the plural peristaltic pumps are respectively allocated, wherein each of the material containers is applied for filling and containing an edible fluid, and one side of the each of the materials tubes extends into each of the material containers and then passes around the peristaltic pump so as to detour to the material discharge fixing device to be fixed therein;

a master controller, respectively connected to the servo motor, the inner pot motor, the material feeding cylinder as well as each of the peristaltic pumps, wherein the exterior of the outer case body is installed with a position difference sensing device connected to the master controller and applied to sense the start and end positions of the rotation of the outer case body in order to limit the outer case body to operate in this safe angle range, and the position difference sensing device also respectively includes a start position determination block, an end position determination block, a start sensing terminal and an end sensing terminal, in which the start position determination block and the end position determination block are respectively installed on a surface of the exterior of the outer case body in opposition to the support body, and the start sensing terminal and the end sensing terminal are respectively installed on a surface of the exterior of the support body in opposition to the outer case body, such that, when the outer case body rotates, if the start sensing terminal detects the start position determination block, or otherwise the end sensing terminal detects the end position determination block, then the master controller controls the servo motor to stop the rotation operation.

2. The automatic edible fluid injection device of food frying machines according to claim 1, wherein the servo motor and each of the material containers are all installed inside the support body.

3. The automatic edible fluid injection device of food frying machines according to claim 1, wherein at least two guide wheels are respectively installed on the edge of the notch opening, a guide board is further arranged on the edge of the notch opening in the outer case body, and the guide board is located between the two guide wheels.

4. The automatic edible fluid injection device of food frying machines according to claim 1, wherein the formed angle ranges from 95° to 110°.

5. The automatic edible fluid injection device of food frying machines according to claim 4, wherein an adjustment block is installed on the material feeding arm for connecting the material feeding arm and the material discharge fixing device, and an arc-shaped long hole is opened on the adjustment block, and the material discharge fixing device is convexly installed with a protrusion which can extend into the long hole, such that the material discharge fixing device is allowed to pivotally rotate on the adjusting block for adjusting the formed angle, while the long hole and the protrusion restrict the adjustment range of the formed angle.

6. The automatic edible fluid injection device of food frying machines according to claim 1, wherein the edible fluid adding angle ranges from 62° to 72°.

\* \* \* \* \*